United States Patent
Tisbo

(10) Patent No.: US 9,972,984 B1
(45) Date of Patent: May 15, 2018

(54) CABLE MANAGEMENT ASSEMBLY

(71) Applicant: Custom Plastics, Inc., Elk Grove Village, IL (US)

(72) Inventor: Peter Tisbo, Elk Grove Village, IL (US)

(73) Assignee: Custom Plastics, Inc., Elk Grove Village, IL (US)

( * ) Notice: Subject to any disclaimer, the term of this patent is extended or adjusted under 35 U.S.C. 154(b) by 0 days. days.

(21) Appl. No.: 15/616,686

(22) Filed: Jun. 7, 2017

(51) Int. Cl.
*H02G 3/04* (2006.01)

(52) U.S. Cl.
CPC ............... *H02G 3/0475* (2013.01)

(58) Field of Classification Search
CPC .. H02G 3/0475; H02G 3/0437; H02G 3/0456; H02G 3/00; H02G 3/02; H02G 3/04; H02G 3/0406; H02G 3/0431; H02G 3/0616; H02G 3/0625; B60R 16/0215; B60R 16/0207
USPC ..... 174/97, 68.1, 68.3, 72 A, 135; 248/68.1, 248/49; 138/111, 118.1, 120, 121
See application file for complete search history.

(56) References Cited

U.S. PATENT DOCUMENTS

| | | | |
|---|---|---|---|
| 4,484,020 A | 11/1984 | Loof et al. | |
| 5,240,209 A * | 8/1993 | Kutsch | H02G 3/0487 248/49 |
| 5,638,672 A * | 6/1997 | Furukawa | H02G 11/006 248/49 |
| 5,839,476 A | 11/1998 | Blase | |
| 6,156,974 A * | 12/2000 | Blase | H02G 11/006 174/68.3 |
| 6,408,889 B1 * | 6/2002 | Komachi | A61B 1/0055 138/120 |
| 6,575,654 B2 | 6/2003 | Wentworth et al. | |
| 6,585,195 B2 | 7/2003 | Wentworth et al. | |
| 6,609,684 B2 | 8/2003 | Van Scoy et al. | |
| 7,026,553 B2 | 4/2006 | Levesque et al. | |
| 7,073,299 B1 * | 7/2006 | diGirolamo | E04B 2/7453 52/241 |
| 7,439,446 B2 | 10/2008 | Blase et al. | |
| 7,893,353 B2 | 2/2011 | Utaki | |
| 8,024,916 B2 * | 9/2011 | Kuebel | H02G 3/0475 248/49 |
| 8,297,560 B2 * | 10/2012 | Hung | H02G 3/0493 174/95 |

(Continued)

FOREIGN PATENT DOCUMENTS

EP        1099058 B1    11/2004

*Primary Examiner* — Angel R Estrada

(74) *Attorney, Agent, or Firm* — McHale & Slavin, P.A.

(57) ABSTRACT

A cable management assembly based upon adjustable link members for use in guiding cables. A joint connector is positioned along an inner surface of the link member having two shanks that are spaced apart and extend outward from a first edge of the bottom wall terminating with a ball. A receptacle connector is positioned along an opposite edge of the bottom wall and formed from two sockets sized for receipt of each ball. The ball and socket assembly includes a first raised ridge to capture the ball for spacing an adjoining link member a first distance, a second raised ridge is used to capture the ball for spacing the adjoining link member a second distance, and a third raised ridge is used to capture the ball for spacing the adjoining link member a third distance. The link members allow angular placement for optimum cable management.

16 Claims, 8 Drawing Sheets

(56) References Cited

U.S. PATENT DOCUMENTS 8,448,669 B2 * 5/2013 Wen .................... F16C 1/26
  138/120
9,809,179 B2 * 11/2017 Inoue ................ B60R 16/0215

* cited by examiner

CABLE MANAGEMENT ASSEMBLY

FIELD OF THE INVENTION

This invention pertains to the field of cable management and, in particular, a cable management system that allows for ease of configuration.

BACKGROUND OF THE INVENTION

Computers have become a necessity to run a business. The use of a computer has also become commonplace in most every modern home. Unfortunately, computers and related electronic equipment require numerous cables for operation. For instance, a conventional computer system requires cabling for power, monitors, keyboards, cursor controllers, battery back-ups, printers and so forth. A common desktop may include cabling for land based telephones, lamps, radios, Wi-Fi connections, power strips for cellular telephone backup and the like.

Despite advances in wireless communication, desktops are covered with cables. For instance, a laptop computer may be wireless, but for extended use, the computer will need to be connected to an electrical power source. If the laptop computer is used for any length of time, the laptop would likely be connected to a larger display screen, bigger keyboard and so forth, again leading to numerous cables. The cables may be tied together for organization, but still leave an unsightly bundle. Use of such devices on modern glass tabletops highlights the need for cable organization and concealment. For instance, the placement of a computer, printer, telephone or the like on a table for use will require the device(s) to be powered by an electrical source. Whether the electrical outlet is located on a wall or on a floor, cabling will be required to connect the device to an electrical outlet. For this reason, devices have been commercialized in an effort to conceal the cables using a cable management system. Known cable management systems include U.S. Pat. No. 4,484,020 directed to a cable duct that can be covered by a lid. Such a device manages the cable bundle by placing the cords within a guide. A lid is then placed over the guide to conceal the opening for the guide.

U.S. Pat. No. 5,839,476 discloses a cable guide formed from articulated, partially overlapping individual components. The components include two different and alternating shapes that have a snap-on cover.

U.S. Pat. No. 6,575,654 discloses a flexible cable guide having first and second cable guide members. The first end of the first guide member defines a socket; the second guide member is snap fit into the socket of the first cable guide member.

U.S. Pat. No. 6,585,195 discloses a cable guide assembly formed from a curved telescoping trough assembly having a base with upstanding sidewalls and an open top.

U.S. Pat. No. 6,609,684 discloses an adjustable cable management trough having sidewalls extending from a base to define a U-shaped guide.

U.S. Pat. No. 7,026,553 discloses a cable management system formed from a wire cage assembly. A cable guide mounts to the wire cage assembly through a latching mechanism.

U.S. Pat. No. 7,439,446 discloses a cable routing device having links that are joined together in pivoting fashion. The device employs links that are arranged one behind the other in a pivoting manner to obtain a range of 45-135 degrees with the longitudinal axis of the cable routing device.

U.S. Pat. No. 7,893,353 discloses a cable guide device using a bracket joint formed from left and right side link modules having spaced apart plates and coupling portions between the plates.

European Patent EP1099058B1 discloses a ball and socket joint, the socket joint shaped to apply pressure on the ball.

What is presented is an improved cable management system that eliminates the need for a lid to conceal a guide opening, and provides angular adjustment by use of a ball and socket coupling.

SUMMARY OF THE INVENTION

Disclosed is an adjustable cable management assembly, comprising a link member having a bottom wall, two upstanding side walls and a top wall having terminating ends to allow placement of cabling within the link member. A joint connector is positioned along an inner surface of the bottom wall, and is formed from two shanks that are spaced apart and extend outward from a first edge of the bottom wall and terminate with a ball. A receptacle connector is positioned along an opposite edge of the bottom wall and is formed from two sockets sized for receipt of the joint connector. Each socket includes a first raised ridge to capture the ball of an adjoining connector for spacing an adjoining link member a first distance. A second raised ridge is used to capture the ball of an adjoining connector for spacing an adjoining link member a second distance. A third raised ridge is used to capture the ball of an adjoining connector for spacing an adjoining link member a third distance. The link member can be coupled to adjoining link members by insertion of a joint connector of a first link member into a receptacle connector of an adjoining link member. Insertion of the joint connector so that the ball on the end of the shank engages either the first, second or third ridge within the receptacle connector provides a range of angles in any direction. This allows the link members to follow a path, such as the leg of a table. When a plurality of link members are coupled together, the top wall of each link member remains flexible, allowing insertion of cables into a cavity formed by the walls of the link members. The top wall, having a flat top and angled sides, provides an ascetically pleasing shape.

An objective of the invention is to disclose an improved cable management system having a smooth top to conceal cabling with an ascetically pleasing design, without the need for an additional lid.

Another objective of the invention is to disclose a cable management system that can attach to, and form a cable guide way to, most any angular positioned surface.

An additional aspect of the invention relates to incorporating link members to operate as guide channels having frontal access for placement of cabling.

Another aspect of the invention relates to incorporating ball and socket connection to allow angular positioning of adjoining link members.

A further aspect of the invention relates to incorporating a securement element for attaching to a link member, allowing attachment to a surface by an adhesive or a threaded fastener.

Still a further aspect of the invention is to provide a weighted base providing support to the cable management system using an aesthetically pleasing shape.

Another aspect of the invention is to provide a base providing support to the cable management system using a shaped cover that fits around an electrical socket.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DESCRIPTION OF THE PREFERRED EMBODIMENT

Figure 1:
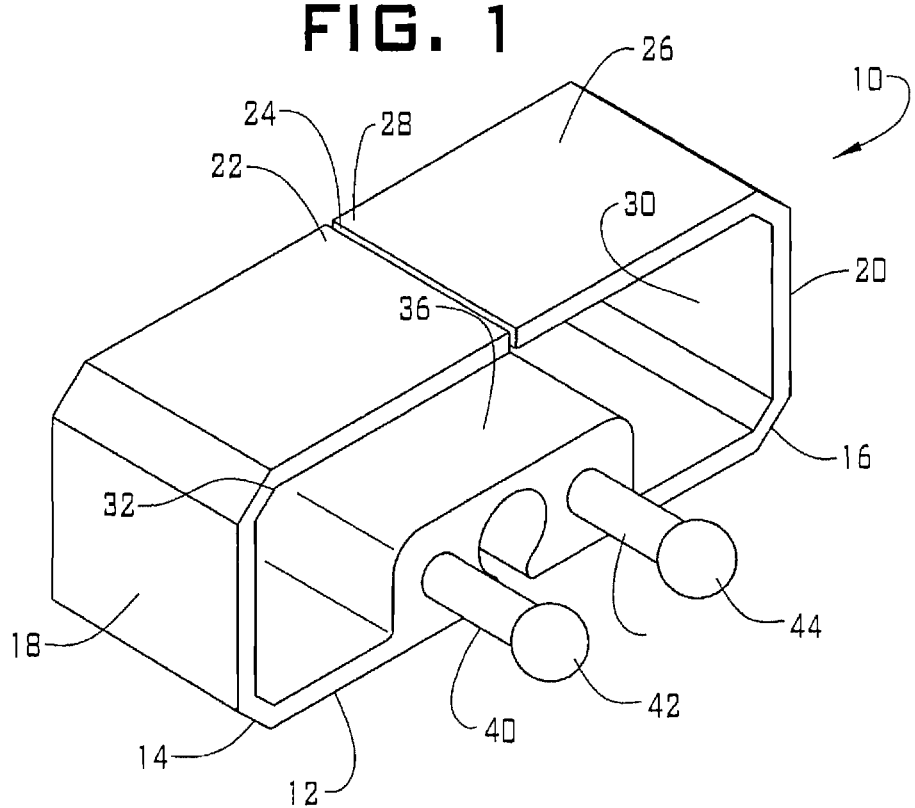
FIG. 1 is a front perspective view of the link member instant invention.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to FIGS. 1-5, set forth is a link member defined by a lower bottom wall 12 having a first end 14 spaced apart from a second end 16. A first upstanding side wall 18 is positioned along the first end 14 and a second upstanding side wall 20 is positioned along the second end 16 of the bottom wall 12. A first top wall 22 extends from said first upstanding side wall 18 to a first terminating end 24. The second top wall 26 extends from the second upstanding side wall 20 to a second terminating end 28. The first and second terminating ends 24 and 28 are juxtapositioned so as to conceal an opening formed by the two meeting top walls 22, 26. The link members, preferably made out of plastic, and the top walls are flexible so as to allow either the first or second, or both, top walls to be pushed inward or pulled outward, allowing cabling to be placed within the substantially open cavity formed along a continuous inner surface 30 formed within the link member. The lower bottom wall 12, side walls 18 and 20, and top walls 22 and 26 form the substantially rectangular open cavity within, and share a common first edge 32 and a common second edge 34.

A joint connector 36 is positioned between the first edge 32 and second edge 34 of the bottom wall 12 along the inner surface 30. The joint connector 36 includes a first shank 40 that extends outward from the first side edge 32 a distance and terminates with a first ball 42. A second shank 44 extends outward from the first edge 32, terminating in a second ball 44. The link member 10 further includes a receptacle connector 50 positioned along the second edge 34, similar to the joint connector formed within the inner surface 30 along bottom wall 12. In the preferred embodiment, the joint connector 36 and receptacle connector 50 share a common body, but may consist of two separate components.

Figure 3:
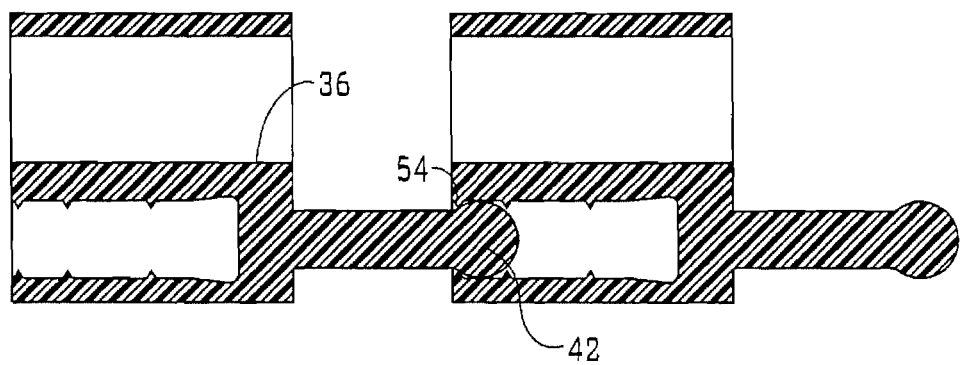
FIG. 3 is a cross-sectional view of two adjoining links placed in the first ridge.
Figure 4:
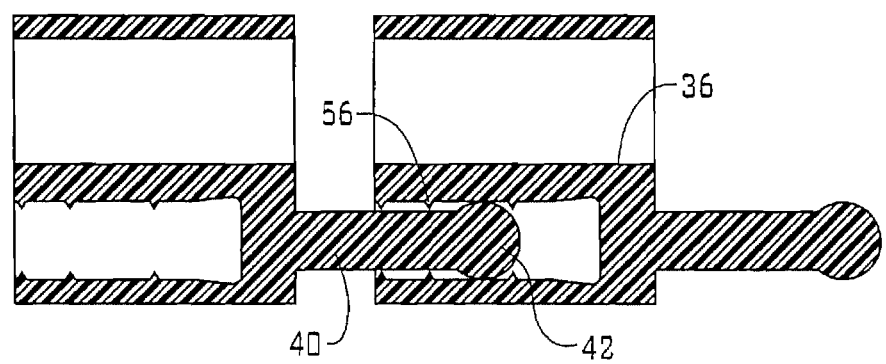
FIG. 4 is a cross-sectional view of two adjoining link members with a joint connector placed in a second ridge.
Figure 5:
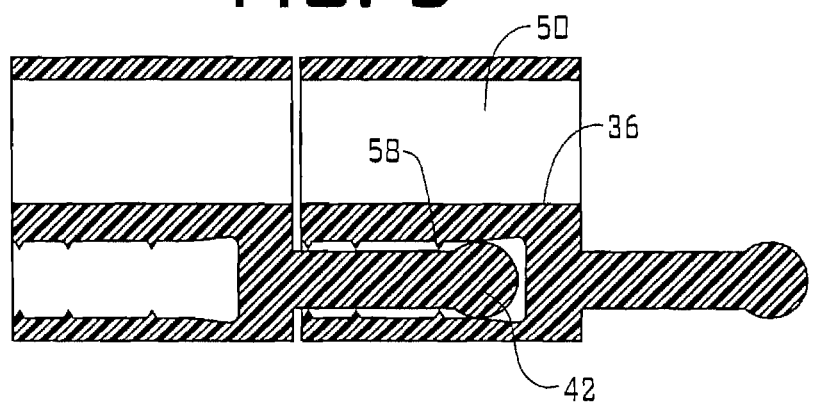
FIG. 5 is a cross-sectional view of adjoining link members with a joint connector in a third ridge.

Set forth in the illustration is a common body shared with the joint connector 36 having a receptacle connector 50 formed along an opposite end. FIG. 3 depicts the receptacle connector 50 having a first socket 52 with a first raised edge 54 to capture the ball 42 of an adjoining joint connector 36 for spacing the joining link member a first distance. FIG. 4 depicts a second raised ridge 56 used to capture the ball 42 of an adjoining connector 36 for spacing an adjoining link member a second distance. FIG. 5 depicts a third raised ridge 58 used to capture the ball 42 of an adjoining connector for spacing an adjoining link member a third distance. The ball 42 has a shank extending outward from the joint connector 34 into the receptacle connector 50 at various positions, which allows the angular positioning of the link member. For instance, if two joint connectors are placed into the receptacle connector along the first ridge, then the spacing between the first link member and the second link member would be equal. If one of the balls was inserted into the receptacle connector to the second ridge, then an angle would be formed between the first link member and the second link member. Similarly, if the ball 42 was placed into the receptacle connector to the third ridge and the second joint connector remained at the first ridge, a larger angular turn between the first and the second link member would be obtained. The link members using the ball and socket allow the link members to follow most any tortuous path, providing an internal cable guideway as the upstanding side walls remain rigid so as to prevent collapse of the top walls during any angular positioning.

Figure 6:
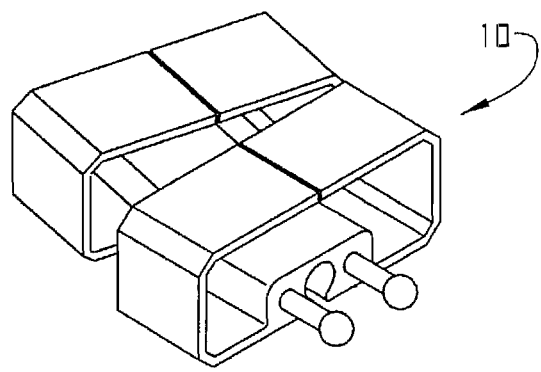
FIG. 6 is a perspective view of two link members joined together.
Figure 7:
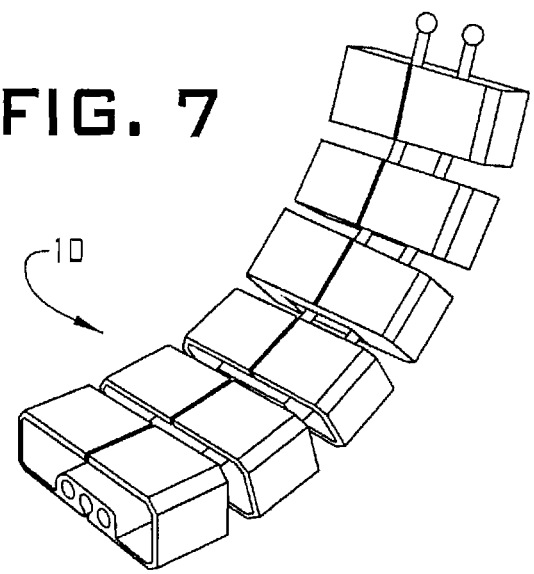
FIG. 7 is a front plane view of link members joined together following an upward curve.
Figure 8:
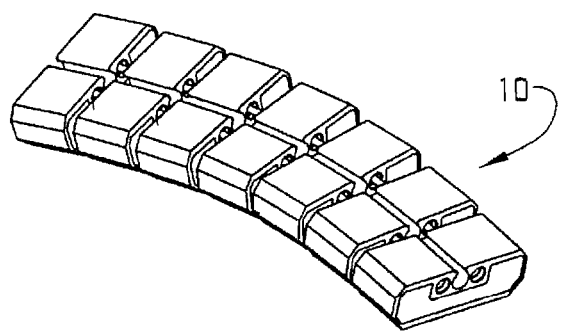
FIG. 8 is a plurality of link members joined together following an angular curve.

FIGS. 6-8 depict link members 10 in various positions between utilizing? the ball 42 and socket 41. FIG. 6 depicts a plane view of the link members when a first ball of a first joint connector is positioned within a first ridge and a second ball of the joint connector is placed within a third ridge, resulting in an angular positioning between the link members. FIG. 7 depicts the link members forming an upward curvature, which may be found in a desk application wherein cables are drawn from the floor area up the side or leg of a desk. FIG. 8 depicts a view of the link members in angular positioning. Variations between an upright positioning, as illustrated in FIG. 7, and angular positioning, as illustrated in FIG. 8, provides unlimited combinations.

Figure 9:
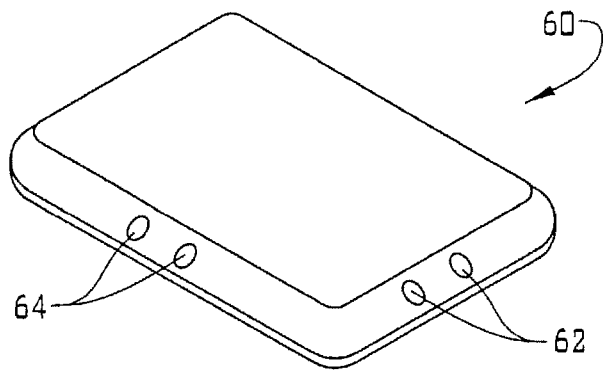
FIG. 9 is a perspective view of a base support.
Figure 10:
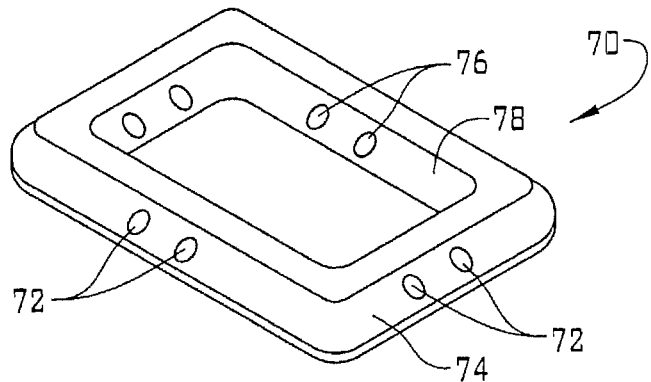
FIG. 10 is a perspective view of a base support for placement around an electrical socket.
Figure 11:
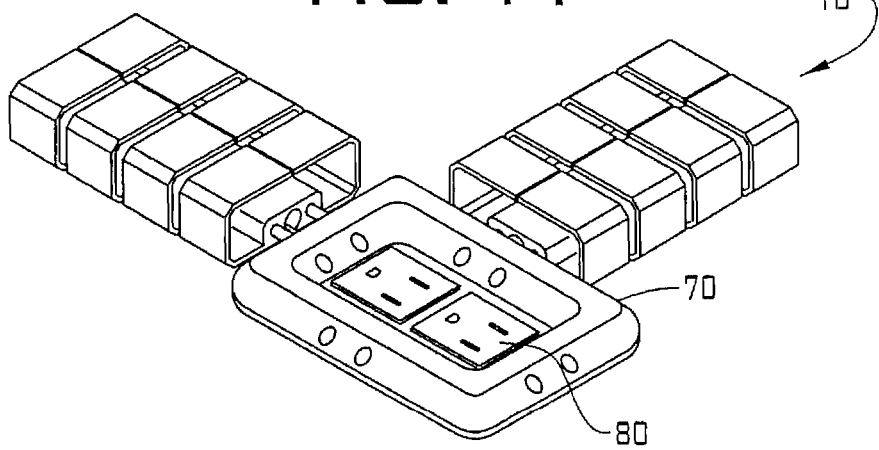
FIG. 11 is a perspective view of a base placed around an electrical socket.

FIG. 9 depicts a base 60 which can be weighted and used to support the link members. Sockets 62, located around each of the side edges, are used for receipt of a joint connector 36. Similarly, FIG. 10-11 depict a base 70 having sockets 72 placed along an outer edge 74 of the base, and a series of sockets 76 placed along an inner edge 78 of the base. In the embodiment shown in FIG. 11, the base 70 may be placed around an electrical socket 80, the joint connectors being placed into the sockets 72.

Figure 12:
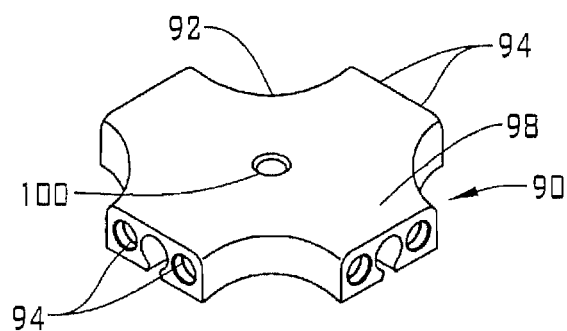
FIG. 12 is a junction element for joining four link members.
Figure 13:
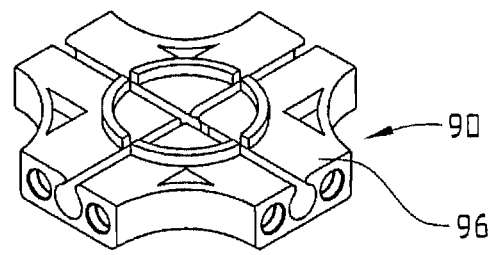
FIG. 13 is a bottom perspective view of FIG. 12.
Figure 14:
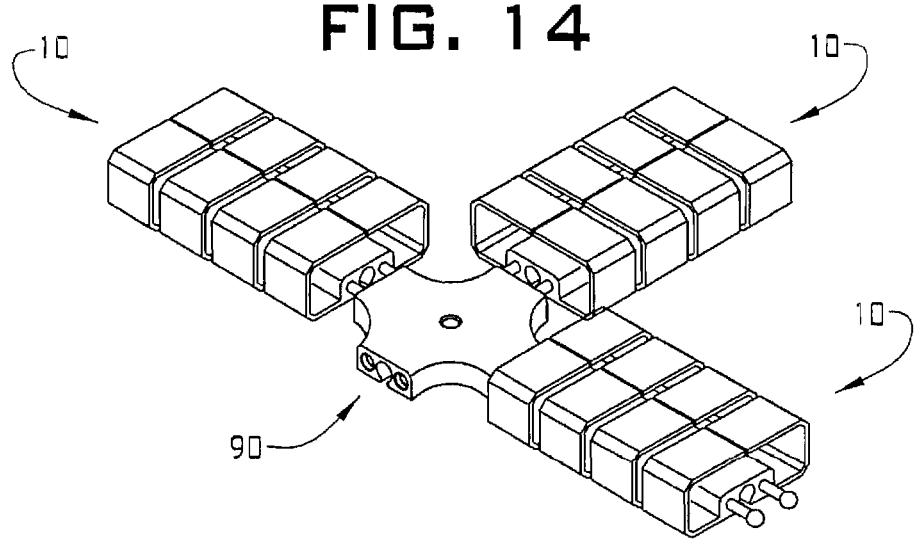
FIG. 14 is an illustration of the joint connector with link members joined on three of the four sides.

FIG. 12 depicts a junction element 90 for joining link members 10, comprising a substantially square-shaped support element. Scallops 92 are removed from the corners of the junction element 90 to provide a more aesthetically pleasing connector and allow angular positioning of a link member 10 directly at the junction element 90. The junction element 90 has four equally spaced connectors 94 with each receptacle connector 50 comprising two sockets for receipt of a joint connector. FIG. 13 illustrates the bottom 96 of the junction element 90, numeral 98 in FIG. 12 depicting the top of the connector. The junction element 90 preferably has an aperture 100 which would allow the junction element 90 to be fastened to a table or other structure by use of a screw fastener. Adhesive may be placed along the bottom 96. The junction element 90 is shown in FIG. 14 connected to link members 10 along three of the sides. Cabling placed through the link members can be routed directly over the junction element 90, the junction element having a low profile so at to allow uninhibited passage of the cables.

Figure 2:
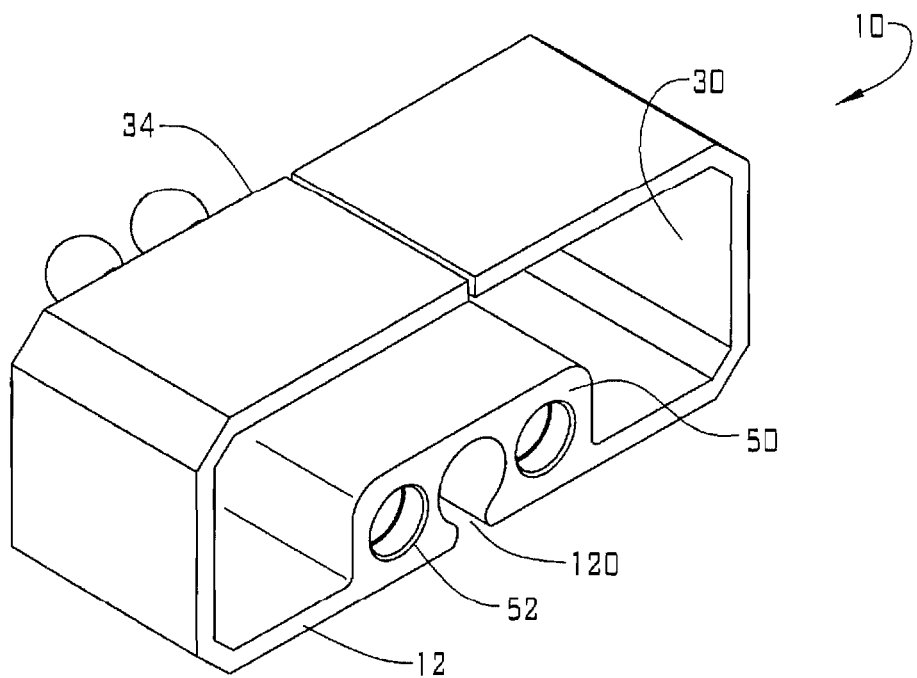
FIG. 2 is a rear perspective view of FIG. 1.
Figure 15:
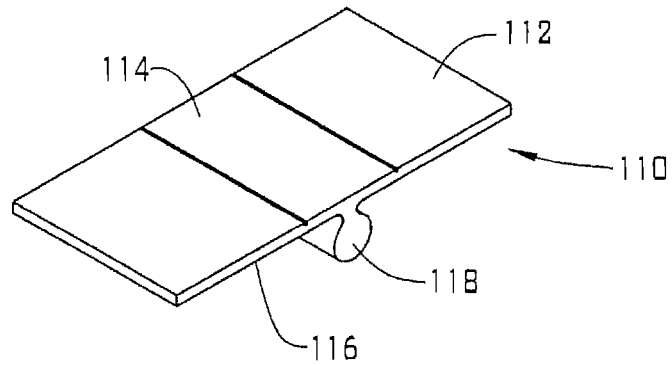
FIG. 15 is a securement element for use with a link member.
Figure 16:
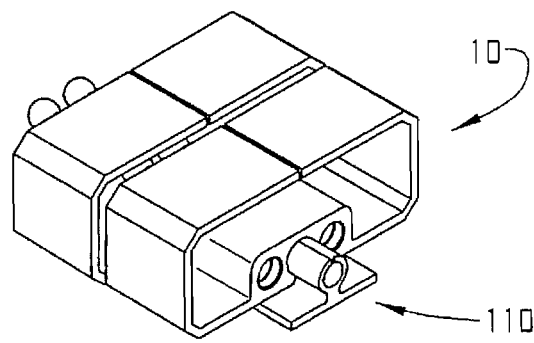
FIG. 16 is an illustration of the link members mounted to the securement member.
Figure 17:
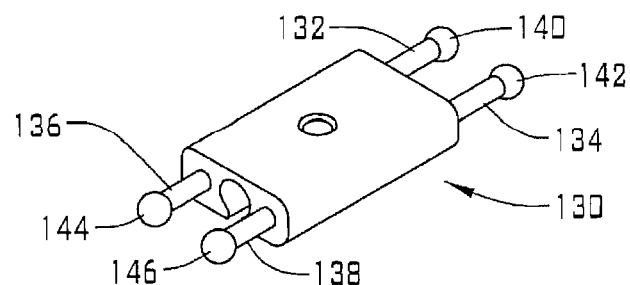
FIG. 17 is a front perspective view of a connector for joining two joint receptacles together.
Figure 18:
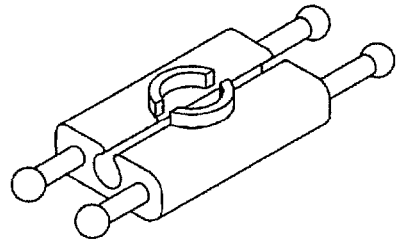
FIG. 18 is a bottom view of FIG. 17.
Figure 19:
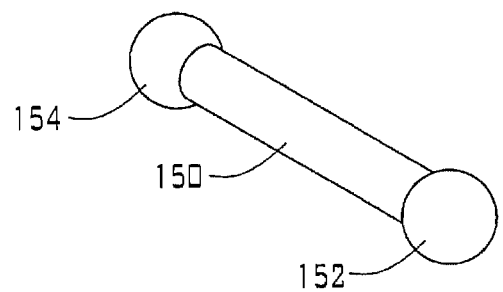
FIG. 19 is a perspective view of a shank with a ball formed on each end.
Figure 20:
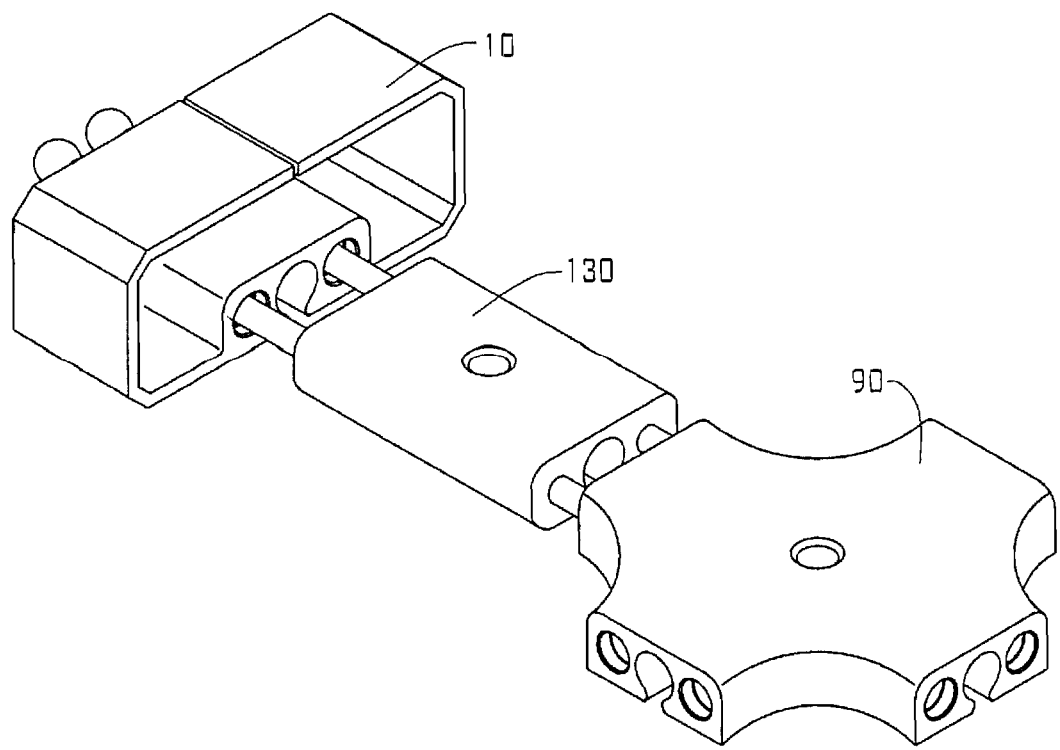
FIG. 20 is an illustration of the joint connector placed in combination with a link member and a junction element.
Figure 21:
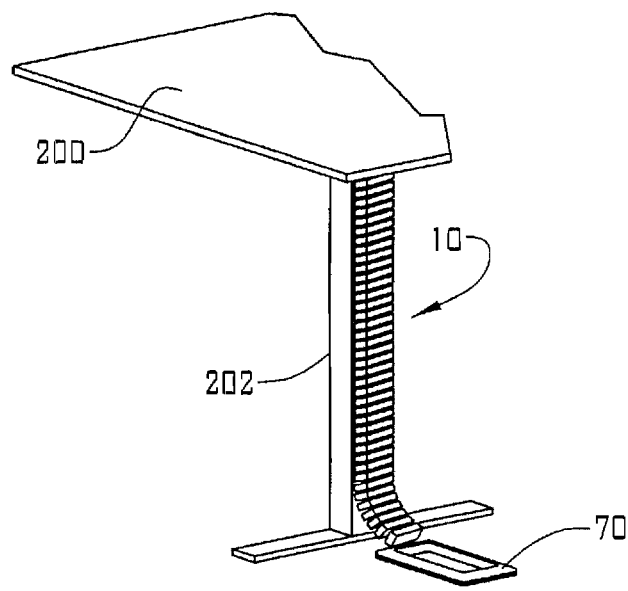
FIG. 21 is an illustration of the cable management assembly attached to a ground outlet.
Figure 22:
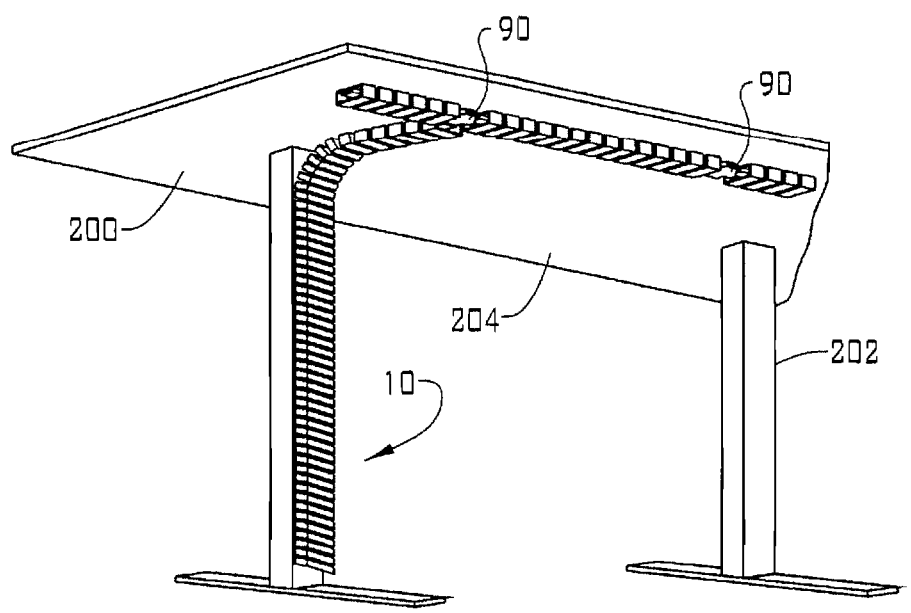
FIG. 22 is a pictorial view of the cable management system placed on the legs and beneath the surface of a table.

A securement element 110 is depicted in FIGS. 15-16, having a bottom 112 for receipt of an adhesive tape 114, allowing the securement member 110 to be attached to most any surface. The top surface 116 of the securement member includes a flange 118, which is insertable into a receptacle 120 as depicted in FIG. 2. The securement element 110 can be placed on most any structure, allowing the link members to be secured to the structure without marring or otherwise damaging the desk or the like support structure. FIG. 17 is a connector 130 for converting receptacle connectors into joint connectors. The connector 130 includes shanks 132 and 134 positioned on one side and shanks 136 and 138 on a second side. Balls 140, 142, 144 and 146 are placed on the end of each of the shanks and allow the connector 130 to interconnect to various assemblies, such as that shown in FIG. 20, connecting a junction element 90 and link member 10. FIG. 18 depicts a bottom view of FIG. 17. FIG. 19 depicts an individual prong comprising a shank 150 having a first ball 152 located on one end of the shank and a second ball 154 located on a second end of the shank. FIG. 21 depicts a perspective view of a table, showing the link assembly attached to an electrical base socket 70, wherein cords coming from the electrical base can be driven up the side of the table 200 along the leg 202. Similarly, FIG. 22 depicts link members 10 going up the leg 202 to the bottom 204 of the table 200, wherein junction elements 90 can be used to release cabling or redirect cabling as needed by the consumer.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cable management assembly comprising:
    a link member defined by a bottom wall having a first end spaced apart from a second end by a predetermined length; a first upstanding sidewall positioned at said first end of said bottom wall, a second upstanding sidewall positioned at said second end of said bottom wall; a first top wall extending from said first upstanding sidewall to a first terminating end, a second top wall extending from said second upstanding sidewall to a second terminating end, said first terminating end juxtapositioned to said second terminating end; said bottom wall, said sidewalls and said top wall forming a substantially rectangular open cavity with an inner surface extending from a common first edge shared with each said wall to a common second edge;
    a joint connector positioned along said first edge inner surface of said bottom wall, said joint connector comprising two shanks that are spaced apart and extend outward from said first edge and terminate with a ball;
    a receptacle connector positioned along said second edge inner surface of said bottom wall, said receptacle connector comprising two sockets for receipt of said joint connector, each said socket including a first raised ridge to capture the ball of an adjoining connector for spacing an adjoining link member a first distance, each said socket including a second raised ridge to capture the ball of an adjoining connector for spacing an adjoining link member a second distance, each said socket including a third raised ridge to capture the ball of an adjoining connector for spacing an adjoining link member a third distance;
    whereby adjoining link members are coupled together by insertion of a joint connector into a receptacle connector;
    wherein insertion distance engages a ridge for spacing of the adjoining link members, said open cavity of the adjoining link members forming a guide for placement of cables.

2. The cable management assembly according to claim 1 wherein positioning of said joint connector within said ridges of said receptacle connector creates an angle between adjoining link members.

3. The cable management assembly according to claim 1 wherein each said top wall end is flexible, allowing insertion of cables into the cavity, each said top wall maintaining a substantially parallel position with said bottom wall.

4. The cable management assembly according to claim 1 wherein said link member is constructed of plastic.

5. The cable management assembly according to claim 1 wherein said securement element is affixed to a support item with a fastener.

6. The cable management assembly according to claim 5 wherein said fastener is adhesive.

7. The cable management assembly according to claim 5 wherein said fastener is a threaded screw.

8. The cable management assembly according to claim 1 including a junction element for adjoining link members comprising: a substantially square shaped support element having four equally spaced receptacle connectors, each said receptacle connector comprising two sockets for receipt of a joint connector, each said socket including at least one raised ridge to capture the ball of an adjoining connector.

9. The cable management assembly according to claim 8 wherein said junction element is affixed to a support item with a fastener.

10. The cable management assembly according to claim 8 wherein said fastener is adhesive.

11. The cable management assembly according to claim 8 wherein said fastener is a threaded screw.

12. The cable management assembly according to claim 1 including an electrical socket junction element for adjoining link members near an electrical socket comprising: a substantially rectangular shaped junction element constructed and arranged to fit over a conventional electrical socket, said junction element having four equally spaced receptacle connectors, each said receptacle connector comprising two sockets for receipt of a joint connector, each said socket including at least one raised ridge to capture the ball of an adjoining connector.

13. The cable management assembly according to claim 12 wherein said junction element is affixed to a support item with a fastener.

14. The cable management assembly according to claim 13 wherein said fastener is adhesive.

15. The cable management assembly according to claim 13 wherein said fastener is a threaded screw.

16. The cable management assembly according to claim 1 wherein said first and second top walls form a substantially flat surface.

* * * * *